United States Patent [19]

Oestreich et al.

[11] Patent Number: 4,641,916

[45] Date of Patent: Feb. 10, 1987

[54] OPTICAL TRANSMISSION ELEMENT

[75] Inventors: Ulrich Oestreich, Munich; Ernst Mayr, Starnberg, both of Fed. Rep. of Germany

[73] Assignee: Siemens Aktiengesellschaft, Berlin and Munich, Fed. Rep. of Germany

[21] Appl. No.: 684,290

[22] Filed: Dec. 20, 1984

[30] Foreign Application Priority Data

Jan. 10, 1984 [DE] Fed. Rep. of Germany ....... 3400605

[51] Int. Cl.$^4$ ................................................ G02B 6/44
[52] U.S. Cl. ............................... 350/96.23; 350/96.34
[58] Field of Search ........................... 350/96.23, 96.34

[56] References Cited

U.S. PATENT DOCUMENTS 4,072,400 2/1978 Claypoole et al. ............... 350/96.23

FOREIGN PATENT DOCUMENTS 2628069 8/1977 Fed. Rep. of Germany ... 350/96.23

Primary Examiner—William L. Sikes
Assistant Examiner—Robert E. Wise
Attorney, Agent, or Firm—Hill, Van Santen, Steadman & Simpson

[57] ABSTRACT

The optical transmission element (AD) comprises a light waveguide (LW) provided with a cushion layer (PS), said light waveguide being positioned within a hard sheath (HL). A glide layer (GS) is provided between said sheath (HL) and said cushion layer (PS). The sheath (HL) is of a material having a modulus of elasticity greater than 2000 N/mm$^2$ and a coefficient of thermal expansion less than $0.8 \times 10^{-4}$/°K.

12 Claims, 1 Drawing Figure

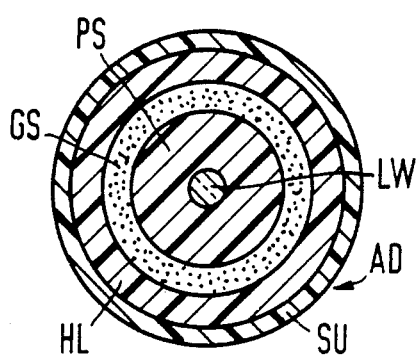

OPTICAL TRANSMISSION ELEMENT

BACKGROUND OF THE INVENTION

1. Field of the Invention

This invention relates to an optical transmission element comprising a fibrous light waveguide surrounded by a cushion layer with both positioned within a sheath of a hard material. There is further provided a glide layer between the sheath and the cushion layer for accommodating relative movement between the sheath and the cushion layer and waveguide.

2. Description of the Prior Art

Optical transmission elements which contain a fibrous light waveguide surrounded by a cushion layer are known in the art. See, for example, DE-OS No. 30 11 009. The element disclosed therein is surrounded by a relatively stiff protective sheath. A parting layer is provided between the cushion layer and the stiff protective layer, and the parting layer permits movement of the light waveguide and the cushion layer on one hand and the outer protective sheath on the other hand.

In use and during processing, such as stranding and the like, the light waveguide may be subjected to undesirable mechanical stresses, and it is desirable to protect the waveguide from such stresses.

It is therefore an object of this invention to provide an improved hard protective sheath which maximizes protection of the sensitive optical fibers of the light waveguide, particularly during various processing procedures.

Another object of this invention is to minimize surface and stress cracking which may occur in the hard protective sheath.

SUMMARY OF THE INVENTION

There is provided by this invention an optical transmission element of the type described above in which protection of the optical fibers is maximized by said sheath having an elastic modulus (E) greater than 2000 N/mm$^2$ and a coefficient of thermal expansion less than $0.8 \times 10^{-4}$/K, preferably between $0.5 \times 10^{-4}$/K and $0.7 \times 10^{-4}$/K. The element also includes a glide layer between the cushion layer and hard sheath for enhancing protection of the light waveguide. When needed, an outer protective layer is provided over the hard sheath for minimizing surface and stress cracking.

BRIEF DESCRIPTION OF THE DRAWINGS

FIG. 1 is a cross-sectional view of an optical transmission element having a light waveguide, cushion layer, glide layer, hard outer sheath and outer protective layer.

DESCRIPTION OF THE PREFERRED EMBODIMENT

Referring first to the drawing, there is shown an optical transmission element (AD) which includes a central light waveguide (LW), surrounded by a cushion protective layer (PS), a glide layer (GS), a hard outer sheath (HL), and a outer protective layer (SU).

Referring now to the hard outer sheath (HL), the use of materials having an elastic modulus (E) greater than 2000 N/mm$^2$ assures a sufficiently stiff sheath. Furthermore, due to the sheath having such an elastic modulus, (1) deformations of the sheath due to local shearing forces (E·A≃1000 N) remain slight and (2) shearing forces (E·A) in the longitudinal and cross-sectional direction of the glass fibers (which are approximately 125 μm in diameter) and the sheath are of approximately the same magnitude. This results, on one hand, in approximately equal division of all forces (roughly 1:1) and, on the other hand, minimizes the risk that the higher coefficient of expansion of the sheath will lead to deformations injurious to the fibers.

For the sheath, coefficients of expansion below $0.8 \times 10^{-4}$/K are preferred because the difference in coefficients of expansion of the fiber and the sheath remains within about one order of magnitude. Assuming a ±50° K. temperature deviation, the maximum forces of $$\frac{50 \times 8 \times 10^{-5} \times 1000}{2} = 2N$$

act on the sheath and the fiber according to the equation $$\frac{\epsilon \times E \times A}{2}$$

These forces are to be viewed as acceptable both mechanically as well as optically.

The thin glide layer (GS) also is temperature responsive, and thus provides a supporting function for the light waveguide fiber (LW) at low temperatures and resists buckling by the crushing forces of this magnitude. The transmission element constructed in accordance with the invention offers protection for the light waveguide (LW), which approximates that of a light waveguide loosely carried within a tubular sheath. An element constructed in accordance with the invention can thus advantageously be stranded into a bundle together with other similarly constructed transmission elements, even in a tightly packed core format. This could not be achieved without appropriate dimensioning of the sheath nor without the high degree of mechanical decoupling between the outer sheath and the cushioned light wave resulting from the use of the glide layer (GS).

The glide layer (GS) is of significance in this context and is fabricated from a cross-linked or thixotropic filling compounds which have a bearing or load carrying ability. The elastic modulus values of the glide layer are below 0.01 N/mm$^2$ and values between 0.01 N/mm$^2$ and 0.001 N/mm$^2$ are particularly suitable.

The elastic modulus for the individual components are roughly as follows:
E modulus LWG glass (LW): 78000 N/mm$^2$
E modulus coating (PS): 10 N/mm$^2$
E modulus filling compound (GS): 0.01 N/mm$^2$
E modulus sheath (HS): 2000 N/mm$^2$ The thickness of the glide layer (GS) is selected between 50 and 100 μm, so as to cooperate in permitting relative movement between the hard sheath (HL) on one hand and the cushioned light waveguide fiber (LW) on the other hand. Movement of the sheath (HL) is taken up or compensated for by the glide layer (GS) and therefore does not reach the light waveguide (LW). The cross-sectional areas for the various elements are approximately as follows:
Light waveguide fiber (LW): 1/80 mm$^2$
Cushion layer (PS): 0.2 mm$^2$
Filling compound (GS): 0.2 mm$^2$
Sheath (HL): 0.3–0.4 mm$^2$
Based on these cross-sectional areas, the local shearing forces (E×A) are as follows:

Light waveguide fiber (LW): 1000 N
Coating (PS): 2 N
Filling compound (GS): 0.2 N
Sheath (HL): 600–1500 N The cushion layer (PS) is desirably of an ultraviolet cross-linked material since at high production speeds freshly drawn fiber can be coated at high speeds using such materials. Moreover, if necessary, removal of the cushion layer (PS) is possible using simple swelling agents, or under certain conditions solely mechanical removal is possible. By comparison, silicone rubber adheres very firmly to the fiber.

Since the outer sheath (HL) should be relatively stiff, materials that are hard and tough are principally considered, that is, raw materials for injection molding of the type which produce high impact resistant housings whose tenacity prevents crack formation. Such injection molding materials includes aramides and polyesters.

Other materials which could be suitable include certain polycarbonates, but due to their high hardness, they are relatively susceptible to stress crackings. This means that fine surface cracks can appear due to the deformations resulting from bending stresses, and water can penetrate through the cracks into the element. The reason for such stress cracking relates to the high frozen-in orientation stresses that can spread and deepen due to surface attacks by ultraviolet light or solvents, even for example, from the glide layer (GS). Since the substances used herein contain a broad mixture of molecular weights —due to manufacturing considerations or intentionally selected to obtain a specific melt index— the stress crack behavior increases with increasing hardness and elastic modulus.

The stress cracking of the sheath can be minimized by coating or applying a protective layer to the exterior surface of the hard sheath, which layer is not or is only very slightly susceptible to stress cracking as compared with the sheath.

High molecular weight materials on a polyester base are preferably employed for the protective layer itself. A preferred combination for the sheath is grilamide/polybutylenterephthalat which is not susceptible to stress cracking either as a combination or individually. However, the aramide can absorb up to 3% moisture and will thus change in dimension depending upon moisture content. The use of a moisture-inhibiting and moisture-resistant polyester layer as an additional protective layer minimizes this potential swelling and cracking problem. The ultraviolet sensitivity of the aramide layer is also eliminated by means of the polyester protective coating.

On the other hand, the polyester layer alone would not be hard or resistant enough to swelling agents (such as found in the glide layer), even if it had a greater thickness, so that the preferred combination of the coated hard sheath offers an optimum stability and protective effect.

The transmission element constructed in accordance with the invention is employable in a particularly advantageous fashion as an individual lead for the formation of stranded lead bundles since the mechanical deformation forces occurring in stranding cannot penetrate or at least cannot penetrate disruptively to the light waveguide due to the hard protective sheath and due to the intervening glide layer.

In view of the use of the transmission element as a lead for the core of an optical cable, one selects the material of the protective layer such that swelling by the potential core filling compound is minimized.

Based on the foregoing general discussion, reference is again made to the drawing. From the center toward the outside, the element includes the light waveguide (LW) which is surrounded by the protective or cushion layer (PS). Ultraviolet cross-linkable materials are preferably employed for the cushion layer (PS). The cushion layer rests directly on the outer surface of the light waveguide (LW). The cushion layer (PS) is surrounded by a glide layer (GS) which permits movement between the hard outer sheath (HL) and the cushion layer (PS). It is desirable that the glide layer (GS) have minimal bearing properties, and preferably it consists of easily cross-linked or thixotropic material having a low intrinsic viscosity. In order, however, to further assure the decoupling or separation of the light waveguide from movements of the sheath, the glide layer (GS) may only have a very low elastic modulus, advantageously below 0.01 $N/mm^2$, preferably between 0.01 and 0.001 $N/mm^2$.

The outside diameters of the individual component parts of the transmission element are approximately as follows:
Light waveguide (LW): 50–125 $\mu$m
Cushion layer (PS): 250–500 $\mu$m
Glide layer (GS): 400–700 $\mu$m
Sheath (HL): 700–1000 $\mu$m In order to protect the light waveguide fiber (LW) which is surrounded by a soft and thus mobile and cushioned manner from external mechanical stresses, the sheath (HL) is fabricated from a correspondingly hard material such as aramides, polyethersulfones, polycarbonates, etc., being specifically employable for this purpose. Some such hard materials have the disadvantage that orientation stresses exist to a high degree and lead to superficial cracking of the hard layer or sheath due to exposure to ultraviolet light, solvents or wetting agents.

This situation as described above can be minimized with a protective layer (SU) which is not susceptible to stress cracking and which is applied to the outside of the hard layer (HL). The protective layer is so elastic that any and all cracks on the inside layer or (HL) are minimized.

The outer protective layer (SU) desirably consists of a highly plastic material on a polyester base which can be applied by means of a tubular die immediately following the extrusion process for the stiff sheath (HL). One such material is sold under the name Vestodur B 3000 (polybutylene terephthalate) by Firma Chemische Werke Huels (4370 Marl, West-Germany). The wall-thickness of this protective layer (SU) can be relatively thin, between 10 and 80 $\mu$m and advantageous at 50 $\mu$m. It should amount to between 10 and 50%, preferably about 30% of the wall thickness of the sheath (HL). Even relatively thin wall thicknesses of the protective layers already form adequate protection against stress cracking of the stiff sheath (HL). A protective layer (SU) is applied to the sheath (HL), such that it adheres to the latter, so that no lifting or separation of layers from one to another occurs in the event of bending, which possibly could lead to buckling under severe bending. In the ideal sheath combination, moreover, the protective layer has strengths which complement the weakness of the individual layers, for example, water sensitivity of aramides, oil sensitivity of the polyesters, etc.

The wall thickness of the glide layer (GS) advantageously lies between 50 μm and 100 μm; the wall thickness of the sheath (HL) between 80 μm and 140 μm, whereby the values of the diameter from 700 μm to 1100 μm are expedient. The aforementioned dimensions are to be applied in a particularly advantageous fashion given light waveguide leads that are stranded into bundles.

Although the invention has been described with respect to preferred embodiments, it is not to be so limited as changes and modifications can be made which are within the full intended scope of the invention as defined by the appended claims.

We claim as our invention:

1. An optical transmission element (AD) comprising:
   a fibrous light waveguide (LW);
   a cushion layer (PS) engaging and surrounding said waveguide;
   a hard sheath (HL) surrounding and protecting said waveguide and cushion layer;
   a glide layer (GS) disposed between and engaging each of said sheath (HL) and said cushion layer (PS) for accommodating movement between said sheath (HL) and cushion layer (PS), wherein the physical properties of said sheath include an elastic modulus (E) greater than 2000 N/mm$^2$ and a coefficient of thermal expansion less than $0.8 \times 10^{-4}$/K.

2. The transmission element of claim 1 wherein said coefficient of thermal expansion is between $0.5 \times 10^{-4}$/K. and $0.7 \times 10^{-4}$/K.

3. The transmission element of claim 1 wherein said cushion layer (PS) is ultraviolet cross-linked.

4. The transmission element of claim 1 wherein said sheath (HL) is a high-molecular weight, impact-resistant, injection-moldable aramide.

5. The transmission element of claim 1 wherein said glide layer (GS) consists essentially of a cross-linkable material which exhibits load bearing properties.

6. The transmission element of claim 1 wherein said glide layer (GS) consists essentially of a thixotropic material which exhibits load bearing properties.

7. The transmission element of claim 1 wherein the glide layer (GS) has an elastic modulus (E) less than about 0.01 N/mm$^2$.

8. The transmission element of claim 7 wherein the elastic modulus (E) of the glide layer (GS) is between about 0.01 and 0.001 N/mm$^2$.

9. The transmission element of claim 1 wherein there is further provided an adherent protective layer (SU) on the outer surface of said sheath, said protective layer exhibiting low stress cracking susceptibility as compared to said sheath (HL).

10. The transmission element of claim 9 wherein the wall thickness of said protective layer (SU) is between 10% and 50% of the wall thickness of said sheath (HL).

11. The transmission element of claim 10 wherein the wall thickness of the protective layer (SU) is about 30% of the wall thickness of said sheath.

12. The transmission element of claim 9 wherein the wall thickness of said protective layer (SU) is between 10 and 80 μm.

* * * * *